(12) United States Patent
Ishikawa (10) Patent No.: US 6,584,789 B2
(45) Date of Patent: Jul. 1, 2003

(54) VEHICULAR COOLING SYSTEM AND RELATED METHOD

(75) Inventor: Takayuki Ishikawa, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/152,728

(22) Filed: May 23, 2002

(65) Prior Publication Data

US 2002/0184901 A1 Dec. 12, 2002

(30) Foreign Application Priority Data

Jun. 8, 2001 (JP) .......................................... 2001-174103

(51) Int. Cl.$^7$ ............................... F28D 3/00; F28D 5/00
(52) U.S. Cl. ........................................... 62/171; 62/305
(58) Field of Search .......................... 62/171, 305, 271; 261/127, 131

(56) References Cited

U.S. PATENT DOCUMENTS

| | | | | |
|---|---|---|---|---|
| 5,444,991 A | * | 8/1995 | Cox .............................. | 62/305 |
| 5,588,303 A | * | 12/1996 | Parks ........................... | 62/171 |
| 6,213,200 B1 | * | 4/2001 | Carter et al. ................. | 165/285 |
| 2002/0184908 A1 | * | 12/2002 | Brotz et al. ................. | 62/259.2 |

FOREIGN PATENT DOCUMENTS

| | | |
|---|---|---|
| JP | 4-121426 | 10/1992 |
| JP | 6-64029 | 9/1994 |
| JP | 6-317152 | 11/1994 |

* cited by examiner

*Primary Examiner*—Denise L. Esquivel
*Assistant Examiner*—Marc Norman
(74) *Attorney, Agent, or Firm*—Foley & Lardner (57) ABSTRACT

A vehicular cooling system and a related method are disclosed as including a heat-source heat radiator 11 for cyclically supplying coolant water to a heat source 1 for cooling the same, and a moistening-water-condenser heat radiator 19 for cyclically supplying coolant water to and cooling a moistening-water recapturing condenser 5 which condenses and recaptures water from exhaust gases of the fuel cell 1 for moistening the same. A control unit 45 outputs a drive signal to a pump 37 and a distributor 33 to allow a nozzle 27 or a nozzle 29 to inject water to cool the heat radiator 11 or the heat radiator 19 under a condition when a coolant water temperature sensor 41 detects the presence of a temperature of coolant water in the heat source 1 exceeding a given threshold or when a liquid volume sensor 43 disposed in a water tank 9 detects the presence of a moistening water volume remaining below a given threshold and a condition when a moisture sensor 47 located at rear surfaces of the heat radiators 11, 19 detects the presence of moisture remaining below a given threshold.

16 Claims, 13 Drawing Sheets

VEHICULAR COOLING SYSTEM AND RELATED METHOD

BACKGROUND OF THE INVENTION

The present invention relates to a vehicular cooling system and a related method for cooling heat radiators mounted on a vehicle.

In a state-of-the-art, is has been proposed to provide a technology for injecting water to be supplied to an outer surface of a condenser in order for a heat radiation capability of the condenser to be improved in a vehicular air conditioning apparatus (see Japanese Utility Model Provisional Publication No. 6-64029). This technology features that, when pressure at a high pressure side in a coolant circuit, detected with a pressure sensor is developed beyond a given threshold, a pump is driven to initiate water injection through a nozzle.

SUMMARY OF THE INVENTION

By the way, a state-of-the-art fuel cell system is comprised of a heat radiator that cyclically supplies coolant water to a fuel cell to cool the same and a heat radiator for cyclically supplying coolant water to a recapturing condenser that recycles water from exhaust gases emitted from the fuel cell for moistening the fuel cell. With such a structure, since the plural heat radiators are required to be supplied with water at different time instants because of different cooling requirements of the respective heat radiators in the related art technology, the vehicle must carry a large volume of water in order for a sufficient cooling effect to be achieved in the vehicle propelled with the fuel cell. This results in a bulky and heavy overall size in structure while increasing fuel consumption.

Further, in order to keep a stabilized electric power generating efficiency of the fuel cell, while the coolant water temperature must be maintained in a limited range of given values at an inlet of the fuel cell, the presence of conduits located in a remote distance between the heat radiators and the fuel cell causes a delay in response from one state where water is supplied to the heat radiators and lowers the coolant temperature to another state to lower the coolant temperature at the inlet of the fuel cell at a desired level.

It is therefore an object of the present invention to provide a vehicular cooling system and a related method that address the above issues encountered in the related art practice and which is able to effectively cool a plurality of heat radiators without the need for a large volume of water.

In order to achieve the above object, according to an aspect of the present invention, a vehicular cooling system comprises a heat radiator cooling a heat source mounted in a vehicle, a water supply unit supplying water to an outer surface of the heat radiator, a demanded radiation-heat value detecting unit detecting a radiation-heat value demanded by the heat radiator, and a cooling effect detection unit detecting whether the heat radiator is promising to have a cooling effect when an outer surface of the heat radiator is supplied with water. A control unit is operative to drive the water supply unit such that water is supplied to the outer surface of the heat radiator for cooling the same in response to detected values of the demanded radiation-heat value detecting unit and the cooling effect detection unit.

According to another aspect of the present invention, a vehicular cooling system comprises heat radiator means for cooling a heat source mounted in a vehicle, water supply means for supplying water to an outer surface of the heat radiator, demanded radiation-heat value detecting means for detecting a radiation-heat value demanded by the heat radiator, cooling effect detection means for detecting whether the heat radiator is promising to have a cooling effect when an outer surface of the heat radiator is supplied with water, and control means for driving the water supply means to allow water to be supplied to and to cool the outer surface of the heat radiator means in response to detected values of the demanded radiation-heat value detecting means and the cooling effect detection means.

According to a further aspect of the present invention, there is provided a method of cooling a vehicular heat source, which comprises preparing a heat radiator that cools a heat source mounted in a vehicle, preparing a water supply unit that supplies water to an outer surface of the heat radiator, detecting a radiation-heat value demanded by the heat radiator, detecting whether the heat radiator is promising to have a cooling effect when an outer surface of the heat radiator is supplied with water, and controlling the water supply unit in response to detected values produced in the demanded radiation-heat value detecting step and the cooling effect detecting step, respectively, such that water is supplied to the outer surface of the heat radiator for cooling the same.

DETAILED DESCRIPTION OF THE PREFERRED EMBODIMENTS

To describe the present invention more in detail, vehicular cooling systems of preferred embodiments and a related method according to the present invention will be described below in detail with reference to the drawings.

Figure 1:
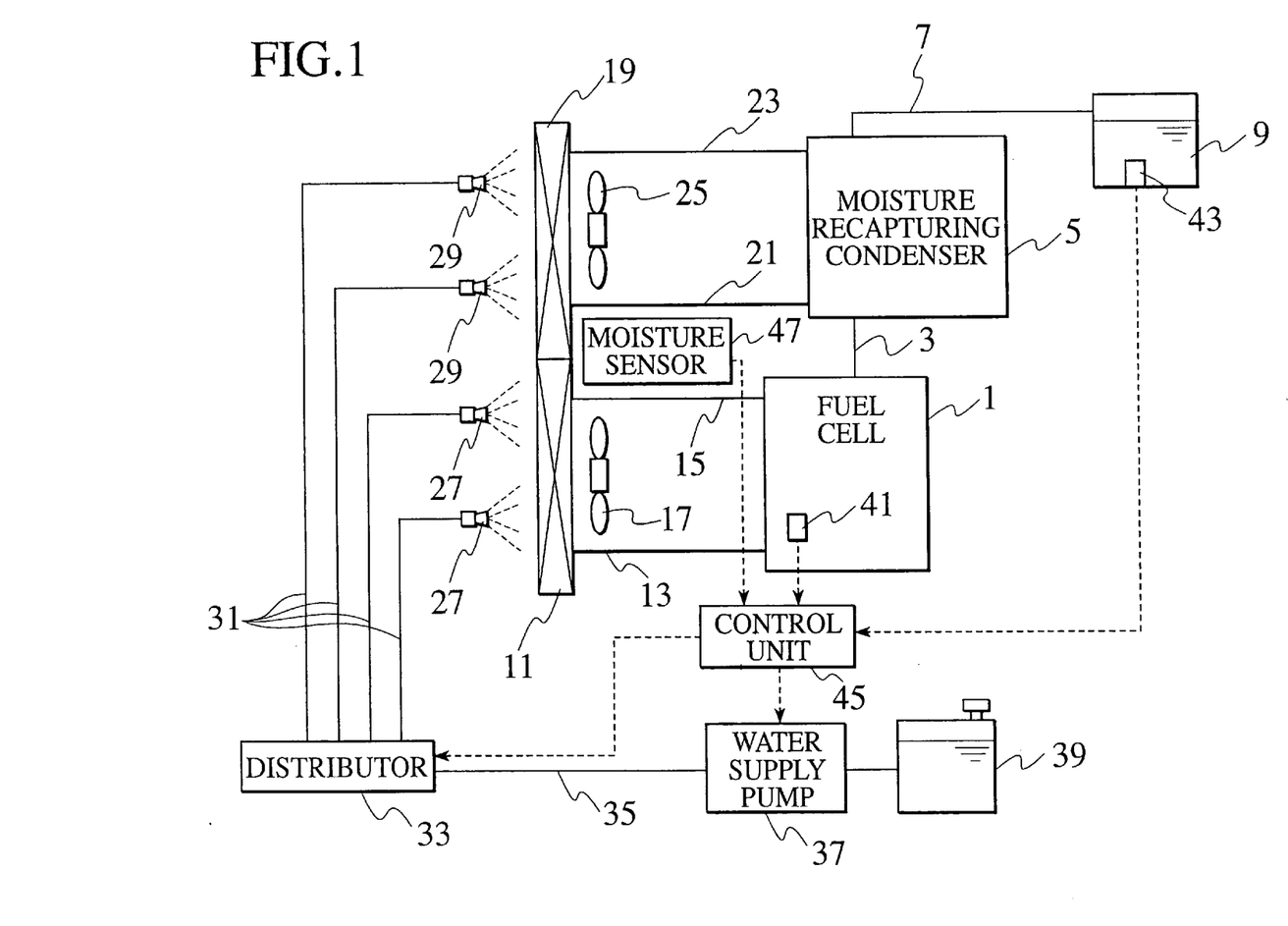
FIG. 1 is an overall structural view of a vehicular cooling system of a first preferred embodiment according to the present invention.

Referring now to FIG. 1, there is shown an overall structure of a vehicular cooling system of a first preferred embodiment according to the present invention. The vehicular cooling system includes a vehicular heat source shown as composed of a fuel cell 1 mounted in a vehicle and including a solid polymer film type fuel cell that employs an electrolyte in the form of a solid polymer film. Such an electrolyte film tends to dry and is required to be moistened with water supplied thereto from outside. To this end, exhaust gases emitted through an exhaust gas pipe 3 from an air electrode of the fuel cell 1 is condensed in a moistening-water recapturing condenser 5. Condensed water is then delivered through a conduit 7 to a moistening tank 9 serving as a water tank and stored therein and is subsequently supplied to the fuel cell 1.

Further, a fuel-cell heat radiator 11 is connected through a supply pipe 13 and a discharge pipe 15 to the fuel cell 1. The fuel-cell heat radiator 11 serves to supply coolant water to a coolant water passage formed in the fuel cell 1 in a circulated fashion to cool the same and includes a cooling fan 17.

Furthermore, a moistening-water-condenser heat radiator 19 is connected through a supply pipe 21 and a discharge pipe 23 to the moistening water recapturing condenser 5. The moistening-water-condenser heat radiator 19 serves to supply coolant water to a coolant water passage formed in the moistening water condenser 5 in a cyclic fashion and includes a cooling fan 25.

The cooling fans 17 and 25 are mounted in the vehicle at rear sides thereof with respect to the heat radiators 11 and 19. Located at forward areas of the vehicle in opposition to the cooling fans 17 and 25 of the heat radiators 11 and 19 are first and second pluralities of water injection nozzles 27 and 29 for injecting water to front faces of the heat radiators 11 and 19.

The water injection nozzles 27 and 28 are connected through respective conduits 31 to a distributor 33, which in turn is connected through a conduit 35 to a water supply pump 37. The water supply pump 37 sucks in water from an injection water tank 39 and delivers it to the distributor 33. The distributor 33 is so constructed as to individually control the supply of or the interruption of water with respect to the conduits 31. Thus, the water injection nozzles 27 and 29, the distributor 33 and the pump 37 form a water supply unit.

A coolant-water temperature sensor 41 is mounted to the fuel cell 1 at an area close proximity to an inlet port of the coolant water passage and serves as a coolant water detection unit for detecting the temperature of coolant water. On the other hand, a liquid volume sensor 43 is disposed inside the moistening water tank 9 as a water volume detection unit for detecting the amount of moistening water stored therein. These sensors 41 and 43 form a demanded radiation-heat value detection unit for detecting a demanded radiation-heat value of the heat radiators 11 and 19.

Detection signals produced by the sensors 41 and 43 are input to a control unit 45 that includes a microcomputer serving as a control means. Further, a moisture sensor 47 is mounted to the vehicle at a rear side of the heat radiators 11 and 19 to serve as a moisture detection unit for detecting moisture at the rear sides of the heat radiators 11 and 19. The moisture sensor 47 forms a cooling effect detection unit for detecting whether a cooling effect is promising when the heat radiators 11 and 19 are supplied with water, producing a detection signal which is input to the control unit 45.

The control unit 45 is responsive to the detection signals from the respective sensors 41, 43 and 47 to output drive signals to the distributor 33 and the pump 37.

Now, the operation of the vehicular cooling system is described below with reference to a flow chart of FIG. 2 that shows control operation of the control unit 45. Initially, in step S301, the control unit 45 reads out the detected results of the coolant-water temperature sensor 41, the liquid volume sensor 43 and the moisture sensor 47.

In step S303, the control unit 45 discriminates whether the coolant water temperature detected by the coolant-water temperature sensor 41 exceeds a given threshold of Tmax. If the coolant water temperature exceeds the given threshold Tmax, then in step S305, a further discrimination is implemented to find out whether the moisture H contained in air at the rear sides of the heat radiators 11 and 19 detected by the moisture sensor 47 is below a given threshold Hmax. If the moisture H is below the given threshold Hmax, the control unit 45 discriminates that the demanded radiation-heat value of the fuel-cell heat radiator 11 exceeds the given threshold, outputting a control signal to the distributor 33 to allow water to be supplied to the nozzle 27. When this takes place, in step S307, water is injected from the nozzle 27 to supply water to an outer surface of the fuel-cell heat radiator 11 for increasing the heat radiation capability of the fuel-cell heat radiator 11.

In a case where, in step S303, the coolant temperature T is lower than the given threshold Tmax or in a case where, in step S305, the moisture H exceeds the given threshold Hmax, in step S309, water to be supplied to the outer surface of the fuel-cell heat radiator 11 is interrupted and operation is shifted to discriminate whether the amount Q of moistening water detected by the liquid volume sensor 43 is below a given threshold Qmin.

If, in step S309, the amount Q of the moistening water detected by the liquid volume sensor 43 is below the given threshold Qmin, then in step S311, a discrimination is performed to find out whether the moisture H of air at the rear sides of the heat radiators 11 and 19 detected by the moisture sensor 47 is below the given threshold Hmin. In this event, when the moisture H is below the given threshold Hmin, the control unit 45 judges that the demanded radiation-heat value of the moistening-water-condenser heat radiator 19 exceeds the given threshold and outputs a control signal to the distributor 33 to permit water to be supplied to the nozzle 29. When this occurs, in step S313, water is injected from the nozzle 29 to supply water to the moistening-water-condenser heat radiator 19, thereby increasing the heat radiation capability of the same.

In a case where, in step S309, the amount Q of moistening water exceeds the given threshold Qmin or in a case where, in step S311, the moisture H exceeds the given threshold Hmax, the supply of water to the moistening-water-condenser heat radiator 19 is interrupted and the operation returns to step S301.

Figure 3:
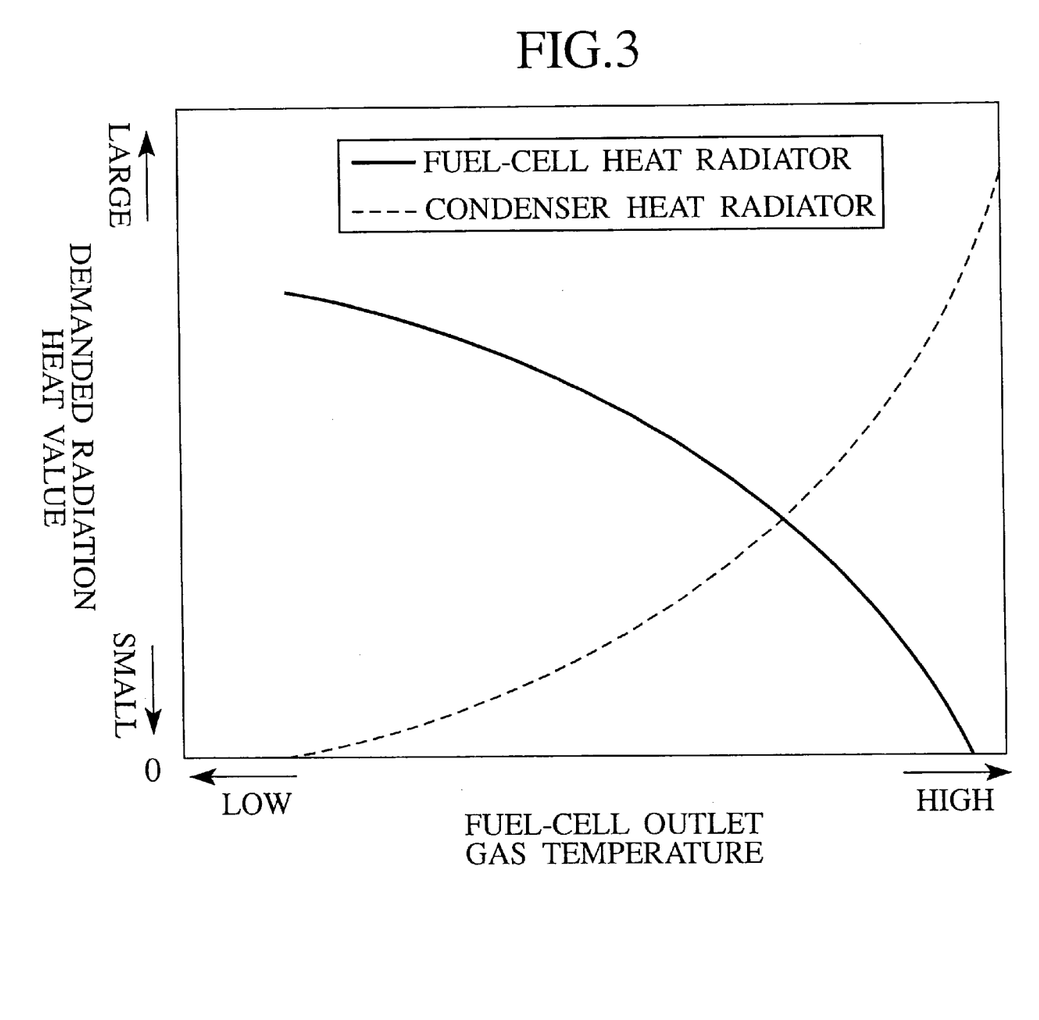
FIG. 3 is a graph illustrating variations in demanded heat values of a fuel-cell heat radiator and a condenser heat radiator plotted in term of an outlet gas temperature of a fuel cell shown in FIG. 1.

FIG. 3 shows the variations in the demanded heat value of the fuel-cell heat radiator 11 and the condenser heat radiator 19 plotted in terms of an outlet gas temperature of the fuel cell 1, with the demanded radiation-heat values of the respective heat radiators 11 and 19 having opposite characteristics. That is, the demanded radiation-heat value of the fuel-cell heat radiator 11 represented by a solid line increases as the outlet gas temperature decreases, whereas the demanded radiation-heat value of the condenser heat radiator 19 represented in broken line increases as the outlet gas temperature increases.

In consideration of such demanded radiation-heat value characteristics, opposite to one another, of the fuel-cell heat radiator 11 and the condenser heat radiator 19, as set forth above, detecting the coolant water temperature and the amount of moistening water to individually achieve the supplies of water in dependence on the detected results, respectively, enables the heat radiators 11 and 19 to be effectively cooled while minimizing the amount of water to be supplied.

In the preferred embodiment, further, the present invention has been described with reference to a technology of supplying water to the heat radiators 11 and 19 when the moisture of air at the rear surfaces of the heat radiators 11 and 19 is below the given threshold. This is because of the fact that there is a less prospect for an effect of vaporization latent heat even when water is supplied in a wet condition with the moisture exceeding the given threshold.

With such a technology, useless consumption of water is prevented, with the minimum amount of water being used to effectively cool the heat radiators 11 and 19.

Figure 4:
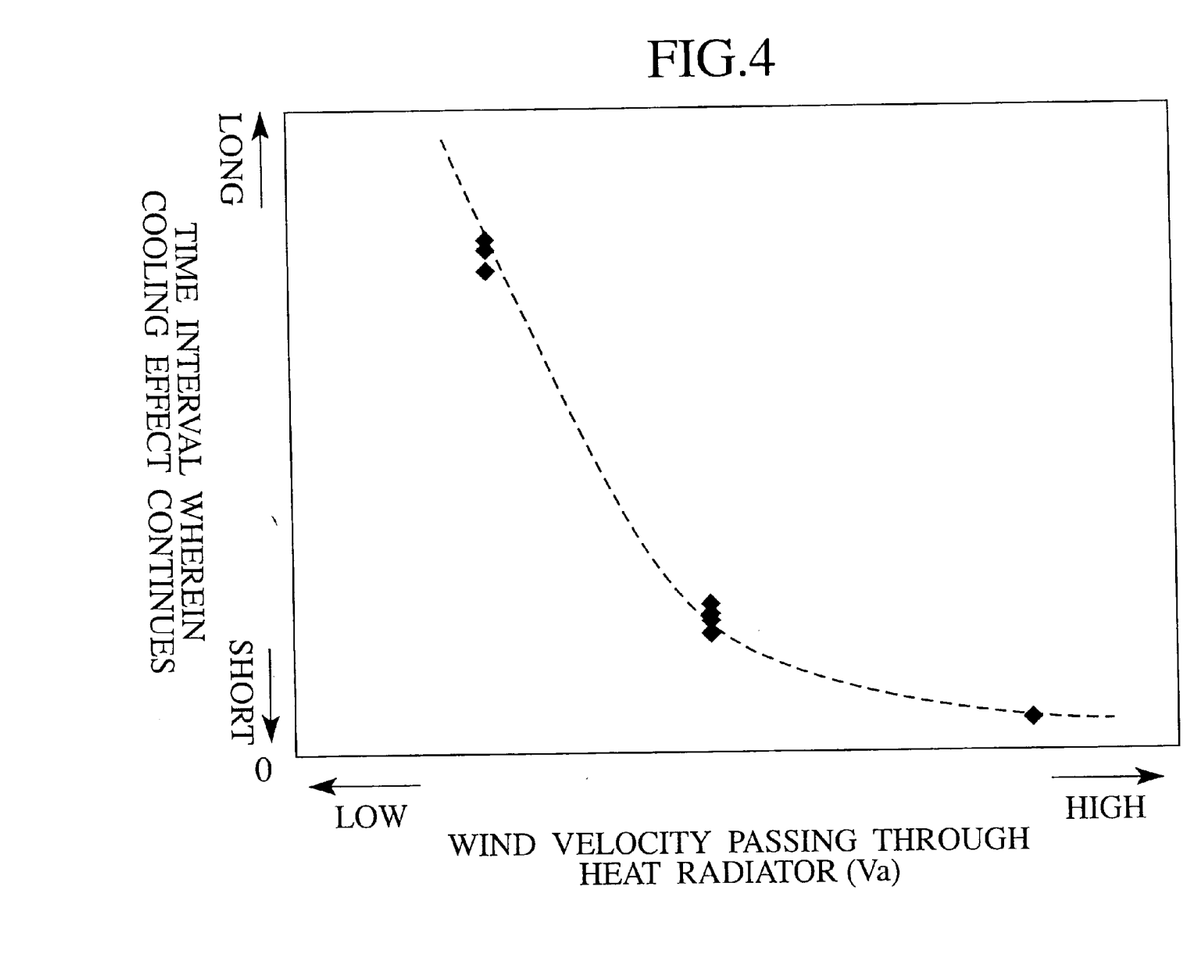
FIG. 4 is a graph illustrating durations of a wind velocity while in transit and a related cooling effect of the heat radiator shown in FIG. 1.

In a case where water is supplied to the outer surfaces of the heat radiators 11 and 19 via the nozzles 27 and 29, while a duration in which water's cooling effect is continued depends on the amount of water retained at the surfaces of the heat radiators 11 and 19, the amount of water to be retained varies in dependence on the wind velocity passing through the heat radiators 11 and 19. FIG. 4 shows the relationship between the wind velocity Va, passing through the heat radiators 11 and 19, and the duration in which the cooling effect is continued (promising) after interruption of water being supplied to the heat radiators 11 and 19. As seen in FIG. 4, there is a tendency wherein the higher the wind velocity, the lower will be the duration in which the cooling effect is sustained.

Accordingly, in place of the moisture sensor 47 serving as the cooling effect detection unit, the wind velocity Va may be estimated by detecting a vehicle speed, which governs the wind velocity Va passing through the heat radiators 11 and 19, and the operating conditions of the cooling fans 17 and 25, and by using the relationship shown in FIG. 4 to preliminarily determine the intervals at which water is supplied, providing a capability of eliminating the amount of water consumption.

Figure 5:
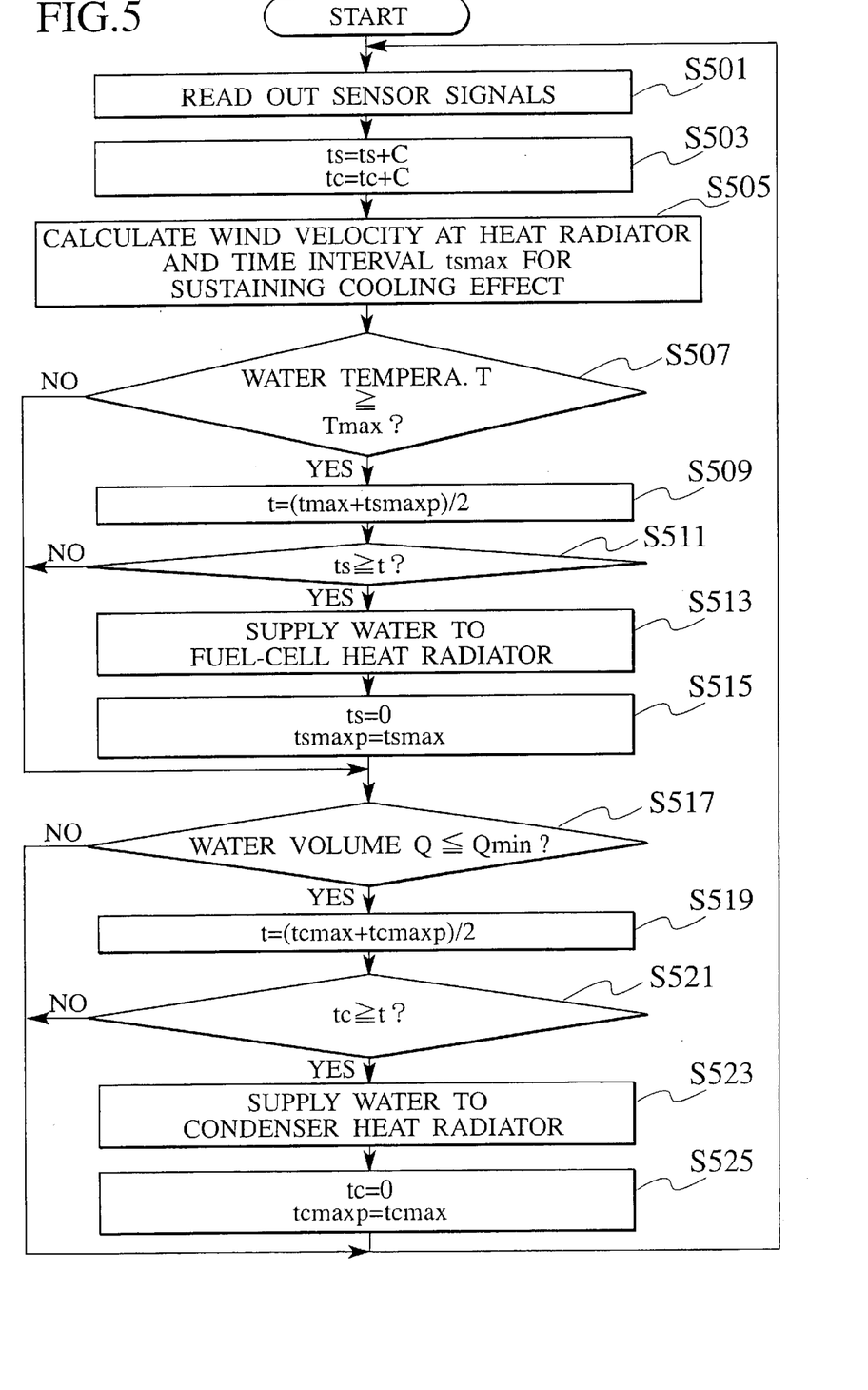
FIG. 5 is a flow chart illustrating a basic sequence of control operation of a control unit of a vehicular cooling system of a second preferred embodiment according to the present invention.

FIG. 5 shows a flow chart illustrating an operation of a control unit 45 of a vehicular cooling system of a second preferred embodiment incorporating the technology set forth above. Initially, in step S501, the detection signals 41 and 43 are read out in the control unit 45. Here, it is assumed that the control unit 45 reads out a signal indicative of the vehicle speed and actuation signals for the cooling fans 17 and 25. In consecutive step S503, calculation of a time counter is performed. Reference symbols ts and tc designate time intervals which have elapsed after water is lastly supplied to the fuel-cell heat radiator 11 and the moistening-water-condenser heat radiator 19, respectively, and reference symbol C designates a unit of time.

Since the wind velocity Va is determined in response to the presence of or the absence of vehicle speed and the actuations of the cooling fans 17 and 25, a related formula representative of such relationship may be preliminarily determined. Executing calculation on the basis of such related formula allows the wind velocity Va to be obtained. In step S505, from the wind velocity Va obtained, operation is performed using the characteristic shown in FIG. 4 to calculate the time interval t smax wherein the cooling effect is sustained. The relationship shown in FIG. 4 is preliminarily stored in a memory of the control unit 45.

In subsequent step S507, discrimination is executed to find out whether the coolant water temperature detected by the temperature sensor 41 exceeds the given threshold Tmax. When the coolant water temperature exceeds the given threshold Tmax, in step S509, averaging the cooling-effect duration t smax, that is supposed from a current vehicle speed, and the time interval t smaxp, that is determined from the vehicle speed at which water is lastly supplied enables calculation of an index value t representative of whether the cooling effect is currently sustained. Thus, the control unit 45 serves as an index value calculation unit in this respect.

Here, in step S511, if there is an elapsed time interval ts of more than the index value t representative of whether the cooling effective is still currently sustained, i.e. when ts≧t, then in step S513, the control unit 45 outputs the signal to the distributor 33 to allow water to be supplied to the fuel-cell heat radiator 11, while, in step S515, resetting the time counter to a state of ts=0 and renewing the value of t smaxp to a state of t smaxp=t smax.

Consecutively, the operation is shifted to step S517 to discriminate whether the amount Q of moistening water detected by the liquid volume sensor 43 is above the given threshold Qmin, and the operation is also shifted to step S517 even when the coolant water temperature T detected in step S507 is less than the given threshold Tmax and when ts<t in step S511.

Here, if the amount Q of moistening water is below the given threshold Qmin, then in step S519, the cooling-effect duration t cmax, that is supposed is from the current vehicle speed, and the time interval t cmaxp, that is determined from the vehicle speed at which the previous water supply is executed, are averaged for thereby calculating the index value t representative of whether the cooling effect is still currently sustained.

Here, in step S521, if there is an elapsed time interval tc of more than the index value t representative of whether the cooling effective is still currently sustained, i.e. when tc≧t, then in step S523, the control unit 45 outputs the signal to the distributor 33 to allow water to be supplied to the condenser heat radiator 19, while, in step S525, resetting the time counter to a state of tc=0 and renewing the value of t cmaxp to a state of t cmaxp=t cmax upon which the operation returns to step S501. The operation is returned to step S501 even when the amont Q of moistening water detected in step S517 is less than the given threshold Qmin and when tc<t in step S521.

Figure 6:
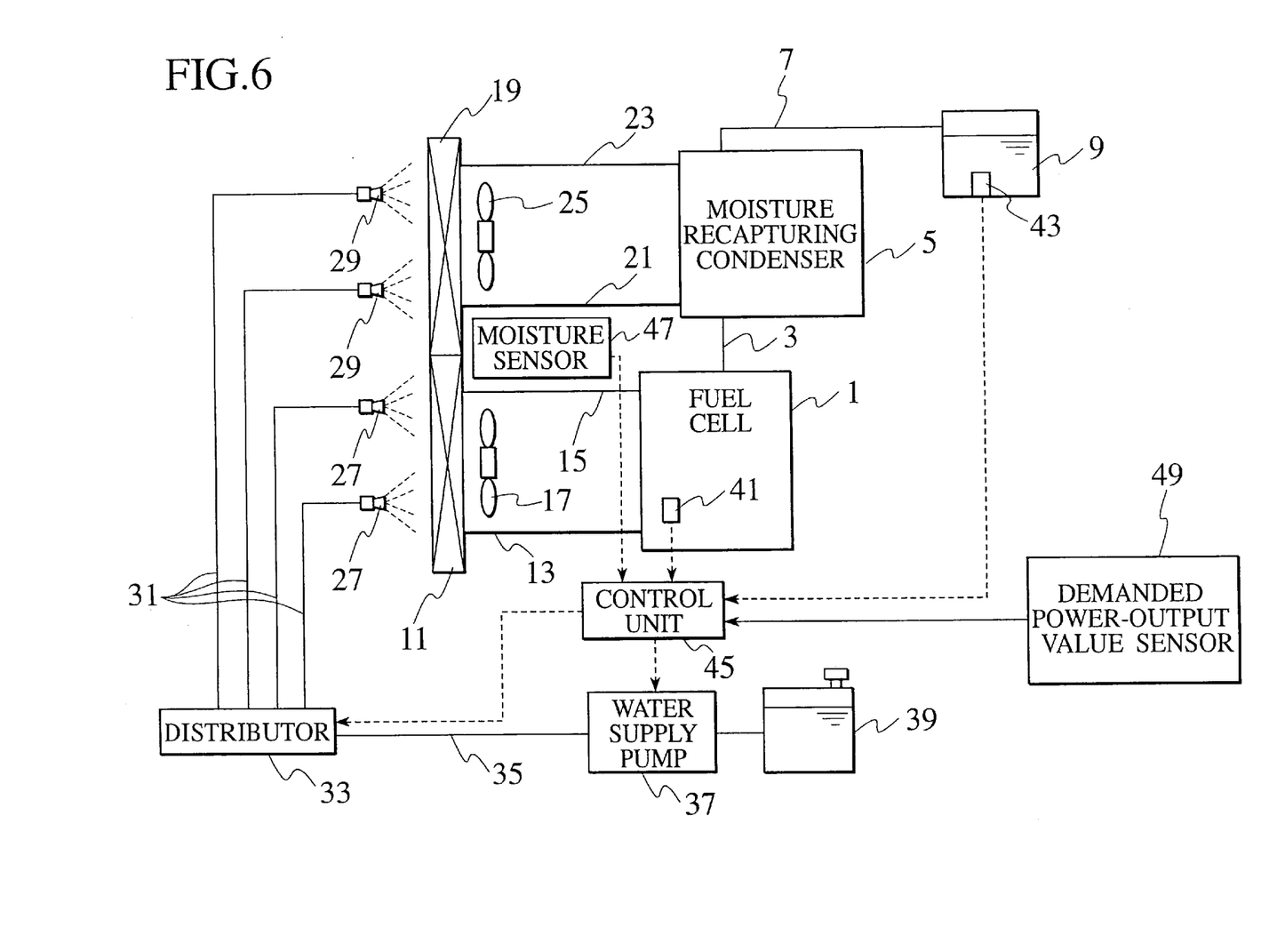
FIG. 6 is an overall structural view of a vehicular cooling system of a third preferred embodiment according to the present invention.

FIG. 6 is an overall structural view showing a vehicular cooling system of a third preferred embodiment according to the present invention, with like parts bearing the same reference numerals as those used in FIG. 1. In the presently filed preferred embodiment, the vehicular cooling system is comprised of a fundamental structure shown in FIG. 1 and additionally includes a demanded power value sensor 49 that detects a demanded power value of the fuel cell 1 whereby the control unit 45 is responsive to the coolant water temperature of the fuel cell 1, the amount of moistening water in the moistening water tank 9 and a varying rate of the demanded power value to predict the inlet coolant temperature and the associated amount of moistening water for the fuel cell 1. In response to such prediction, the control unit 45 is able to carry out water supply at a suitable time instant if desired.

Figure 7:
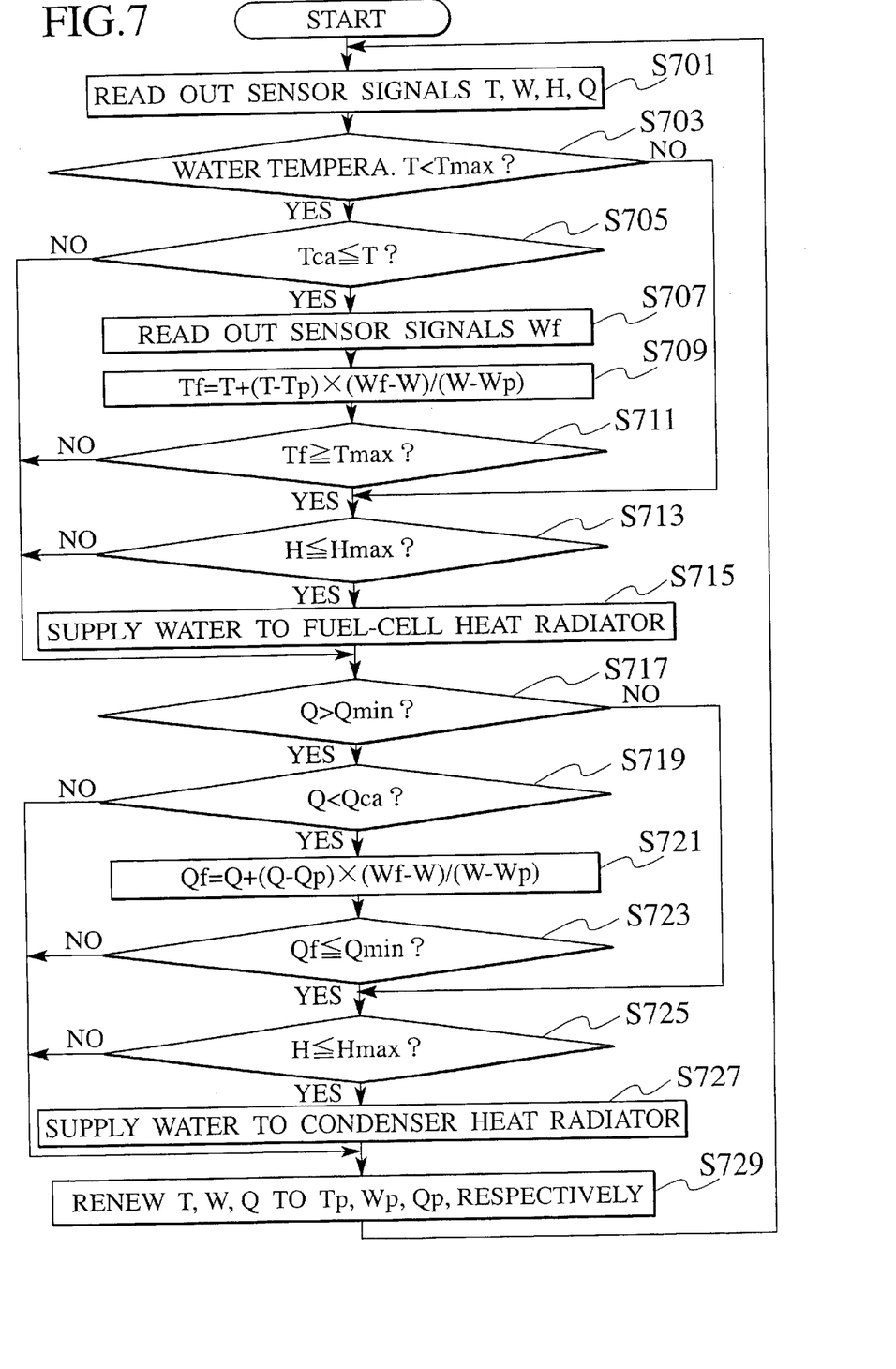
FIG. 7 is a flow chart illustrating the basic sequence of control operation of a control unit shown in FIG. 6.

FIG. 7 is a flow chart for illustrating the control operation of the control unit 45 of the vehicular cooling system of the third preferred embodiment described above. In step S701, firstly, the control unit 45 reads out the respective detected values T, W, H and Q of the coolant water temperature sensor 41, the demanded power value sensor 49, the moisture sensor 47 and the liquid volume sensor 43 and, in step S701, discriminates whether the coolant water temperature T is less than the given threshold Tmax. If the coolant water temperature T is less than the given threshold Tmax, in step S705, it is discriminated whether the coolant water temperature T exceeds a critical, warning water temperature Tca that needs attention if the coolant water temperature exceeds such warning temperature.

Here, if the coolant water temperature T exceeds the warning water temperature Tca, i.e., when Tca≦T<Tmax, the control unit 45 reads out the demanded power value Wf in step S707 and subsequently calculates a predicted value Tf of the coolant water temperature in step S709. Thus, the control unit 45 serves as a coolant-temperature predicting unit. The predicted water temperature Tf is obtained by adding the product obtained by multiplying a difference between the preceding water temperature Tp and the current water temperature T, i.e., the water temperature rising rate per unit time, and the increasing rate (Wf−W)/(W−Wp) of the demanded power value, to the current water temperature T. Here, an appendix "p" designates a value of the signal previously read out in the flow of operation in the control unit 45.

Figure 2:
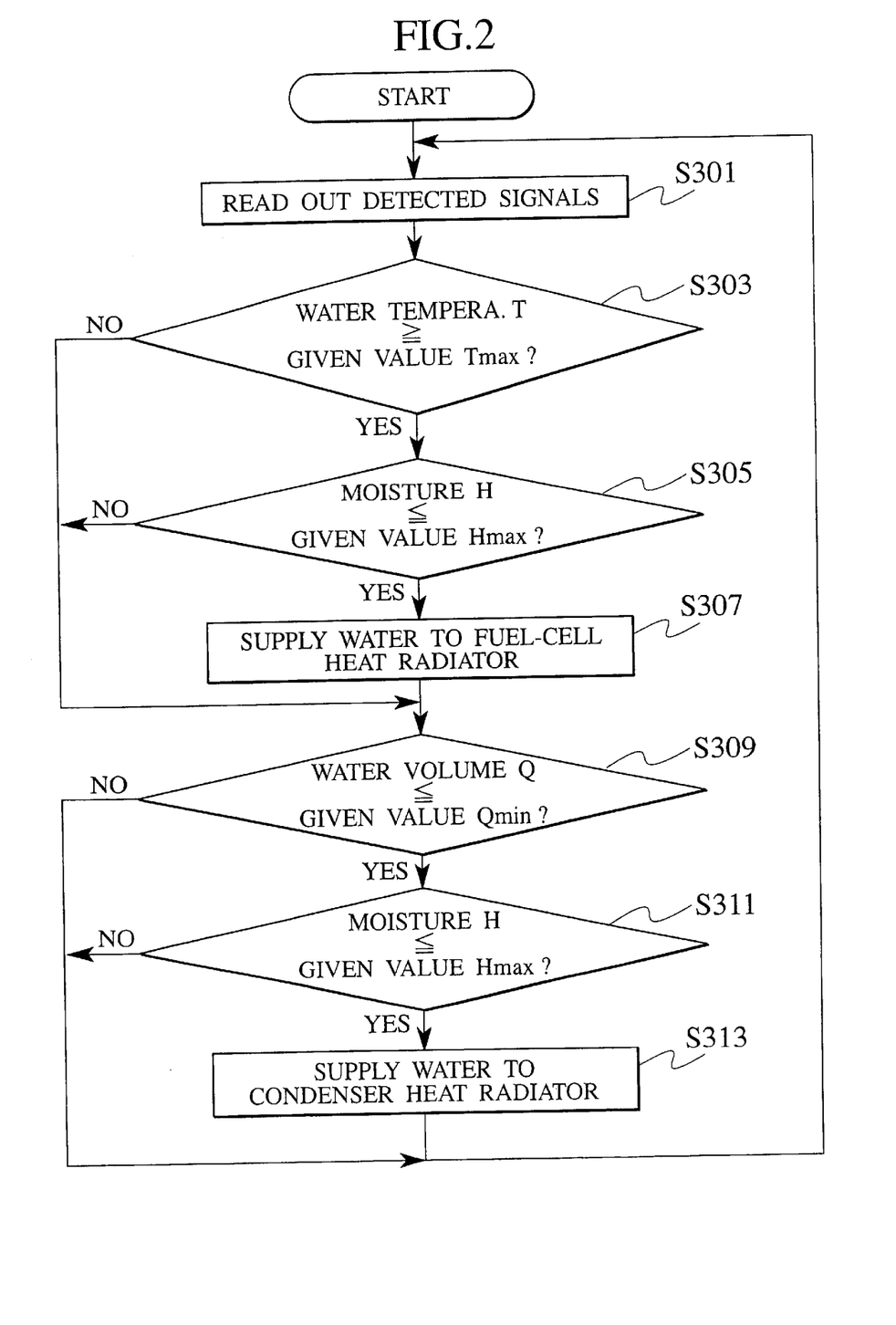
FIG. 2 is a flow chart illustrating the basic sequence of control operation of a control unit shown in FIG. 1.

And, in step S711, if the predicted water temperature Tp exceeds the given threshold Tmax, then in step S713, the control unit 45 confirms whether the moisture H at the rear surfaces of the heat radiators 11 and 19 exceeds the given threshold Hmax using the detected value of the moisture sensor 47 in the same manner as that shown in FIG. 2. On the contrary, if the moisture H is below the given threshold Hmax, then in step S715, the control unit 45 executes control such that water is supplied to the fuel-cell heat radiator 11.

In step S703, if the coolant water temperature T exceeds the given threshold Tmax, the operation goes to step S713 to implement judgment of H≦Hmax. Further, when Tca>T in step S705, Tf<Tmax, and H>Hmax in step S713, the control unit 45 interrupts the supply of water to the fuel-cell heat radiator 11, and the operation goes to step S717 wherein judgment is executed to find out whether the amount Q of moistening water exceeds the given threshold Qmin.

When the amount Q of moistening water exceeds the given threshold Qmin, in step S719, it is judged whether the amount Q of moistening water is less than the warning water volume Qca that needs attention if the moistening water volume Q becomes less than such warning water volume Qca.

Here, when the moistening water volume Q is less than the warning water volume Qca, i.e., when Qca>Q>Qmin, the operation in step S721 is executed to calculate the predicted value Qf of the moistening water volume. Thus, the control unit 45 serves as a water volume predicting unit. The predicted water volume Qf is obtained by adding the product obtained by multiplying a difference between the current water volume Q and the preceding moistening water volume Qp, i.e., a product of the water-volume varying rate per unit time, and the varying rate of (Wf−W)/(W−Wp) in the demanded power output value, to the current water volume Q. And, in step S723, when the predicted water volume Qf is below the given threshold Qmin, then in step S725, the control unit 45 confirms whether the moisture H at the rear surfaces of the heat radiators 11 and 19 is below the given threshold Hmax using the detected value of the moisture sensor 47 as that shown in FIG. 2. In contrast, if the moisture H is below the given threshold Hmax, then in step S727, the control unit 45 executes control such that water is supplied to the moistening-water-condenser heat radiator 19.

Finally, in step S729, the operation is implemented to renew the current water temperature T, the demanded power value V and the moistening water volume Q to read Tp, Wp and Qp, respectively, and the operation returns to step S701.

In step S717 set forth above, if the moistening water volume Q is below the given threshold Qmin, the operation goes to step S725 wherein judgment is implemented to find out whether H≦Hmax. Further, when Q≧Qca in step S719, Qf>Qmin in step S723 and H>Hmax in step S725, the control unit 45 interrupts the supply of water to the moistening-water-condenser heat radiator 19, and the operation goes to step S729.

In the third preferred embodiment set forth above, the control unit 45 has a capability of predicting the increasing rate of coolant water temperature in the fuel cell and the decreasing rate of the moistening water volume in the moistening water tank 9 and supplying water to the respective heat radiators 11 and 19. Thus, even when the heat radiators 11 and 19 are remarkably remotest from the fuel cell 1 and the moistening-water recapturing condenser 5 through the conduits, an issue of a delay in response to a decrease in the coolant water temperature can be reliably addressed. Especially maintaining the coolant water temperature at the inlet of the fuel cell to remain in a range of the given value enables the fuel cell to have a high electric power generating efficiency.

Figure 8:
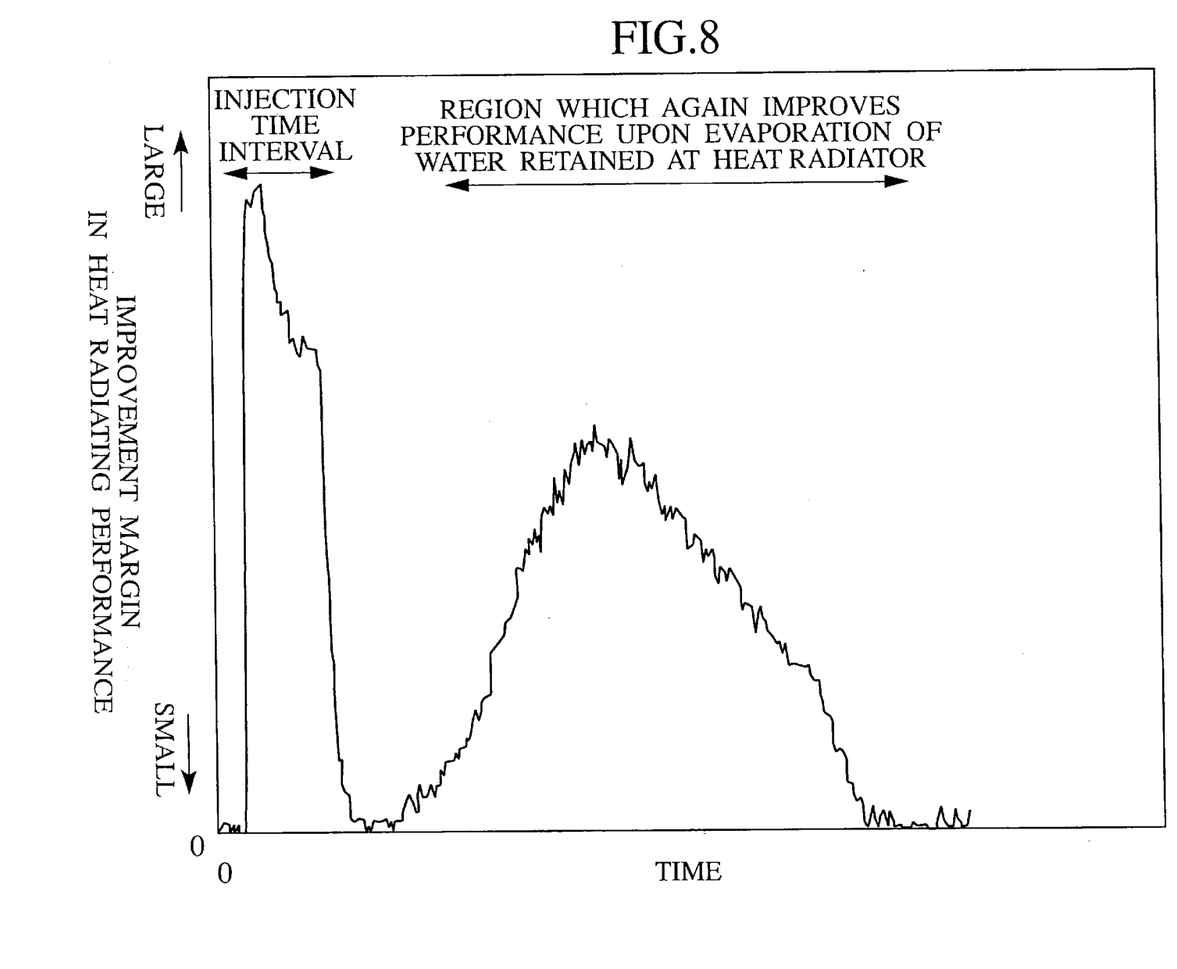
FIG. 8 is a graph illustrating variations in an improvement margin of heat radiating performance, obtained by supplying water to the heat radiator, plotted in terms of time.

Now, a vehicular cooling system of a fourth preferred embodiment is described below. As previously set forth, in order to stabilize the electric power generating efficiency of the fuel cell 1, the coolant water temperature should be stabilized. In this connection, an improvement margin of heat radiating performance obtained by supplying water to the surfaces of the heat radiators 11 and 19 does not remain constant as seen in FIG. 8 and varies in a wide range in terms of time. This is due to the fact that heat flow occurs owing to sensible heat produced when water is supplied and further heat flow occurs owing to latent heat when water retained at the heat radiators 11 and 19 is vaporized after water has been supplied.

In consideration of such characteristics, each of the outer surfaces of the heat radiators 11 and 19 is divided into a plurality of divided surface regions defined in vertical and lateral directions. And, a plurality of nozzles or a single nozzle, of which outlets or outlet are changeably oriented, are allocated to the above divided surface regions while allowing the control unit 45 to transmit control signals to the distributor 33 such that water is supplied at shifted injection timings.

Figure 9:
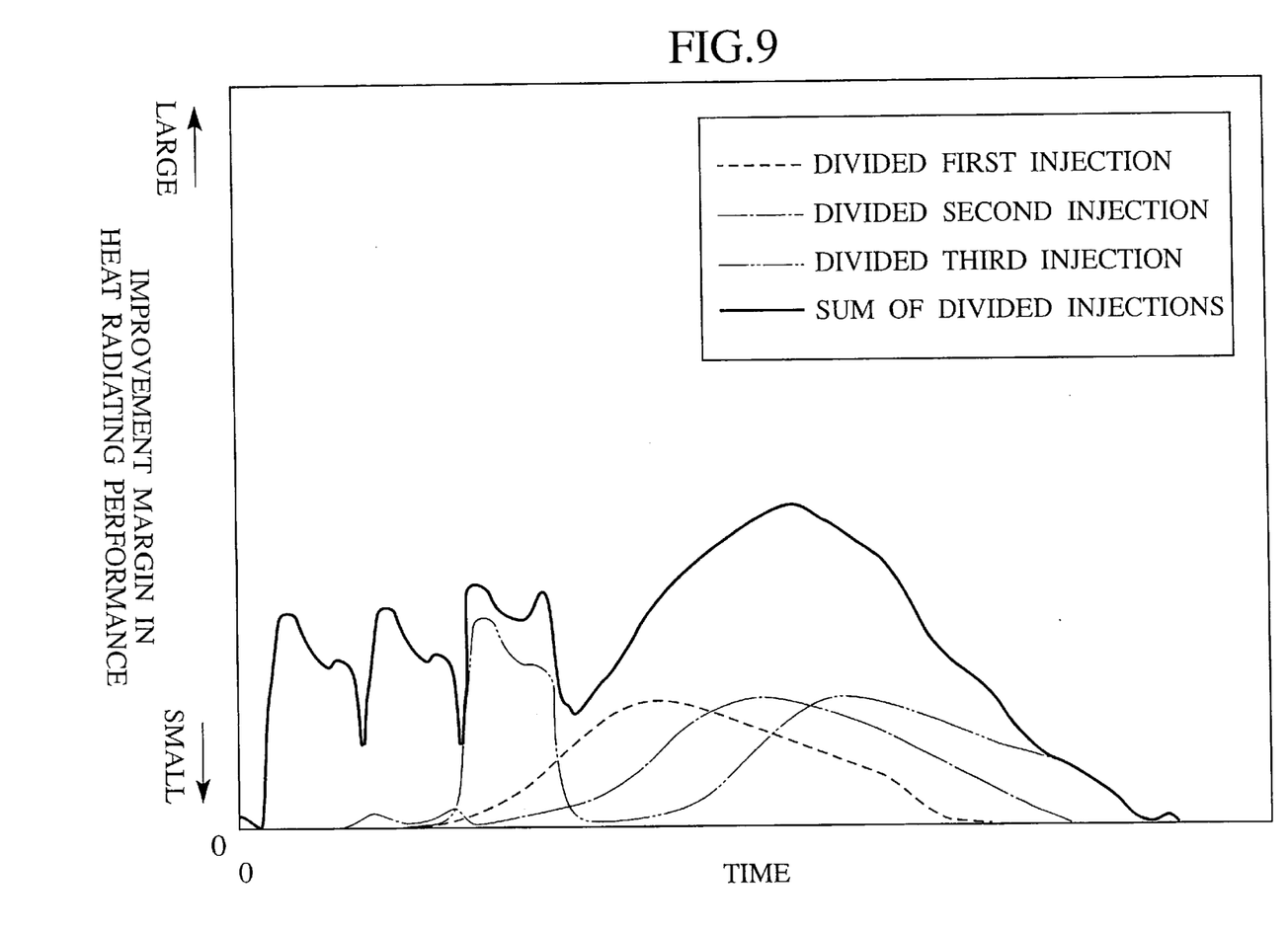
FIG. 9 is a graph illustrating variations in an improvement margin of heat radiating performance, obtained in an event of the heat radiator with an outer surface formed into three divided cooling surfaces while supplying water thereto at an amount of one third per one water injection.

FIG. 9 shows, in a solid line, a variation in the improvement margin of the heat radiating performance attained in a case where respective surfaces of the heat radiators 11 and 19 are divided into three surface regions with an amount of water to be cyclically supplied at once being selected to be one third. In the graph, a dotted line, a one-dot phantom line and a two-dot phantom line indicate a first injection, a second injection and a third injection, respectively. The improvement margin of the heat radiating performance attained on the basis of a sum of three divided injections is derived from the fact that time lags caused by heat flow due to sensible heat and latent heat are standardized to enable the heat radiators to have a stable heat radiating characteristics.

Figure 10:
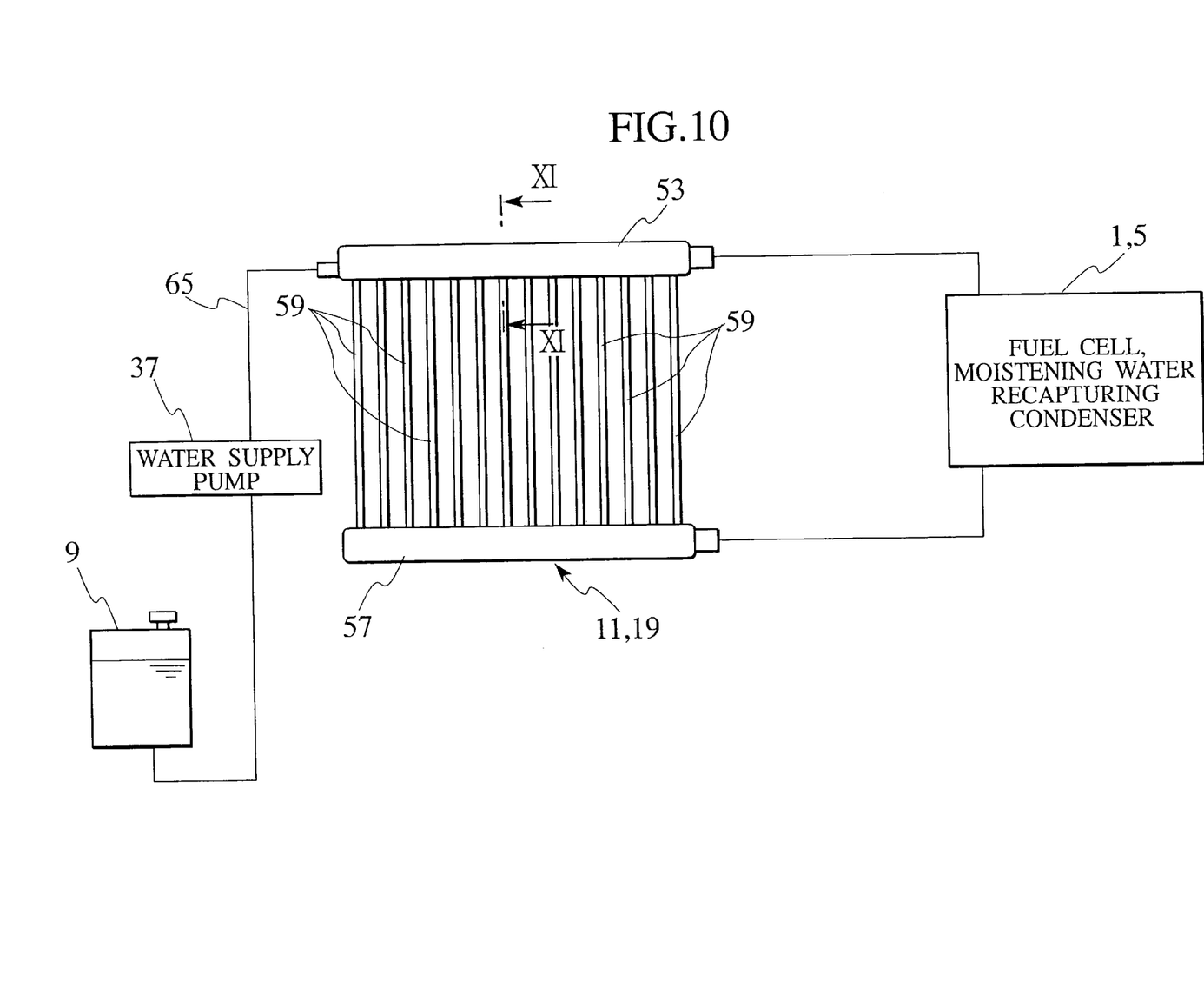
FIG. 10 is a schematic view of a vehicular cooling system of a fourth preferred embodiment according to the present invention.
Figure 11:
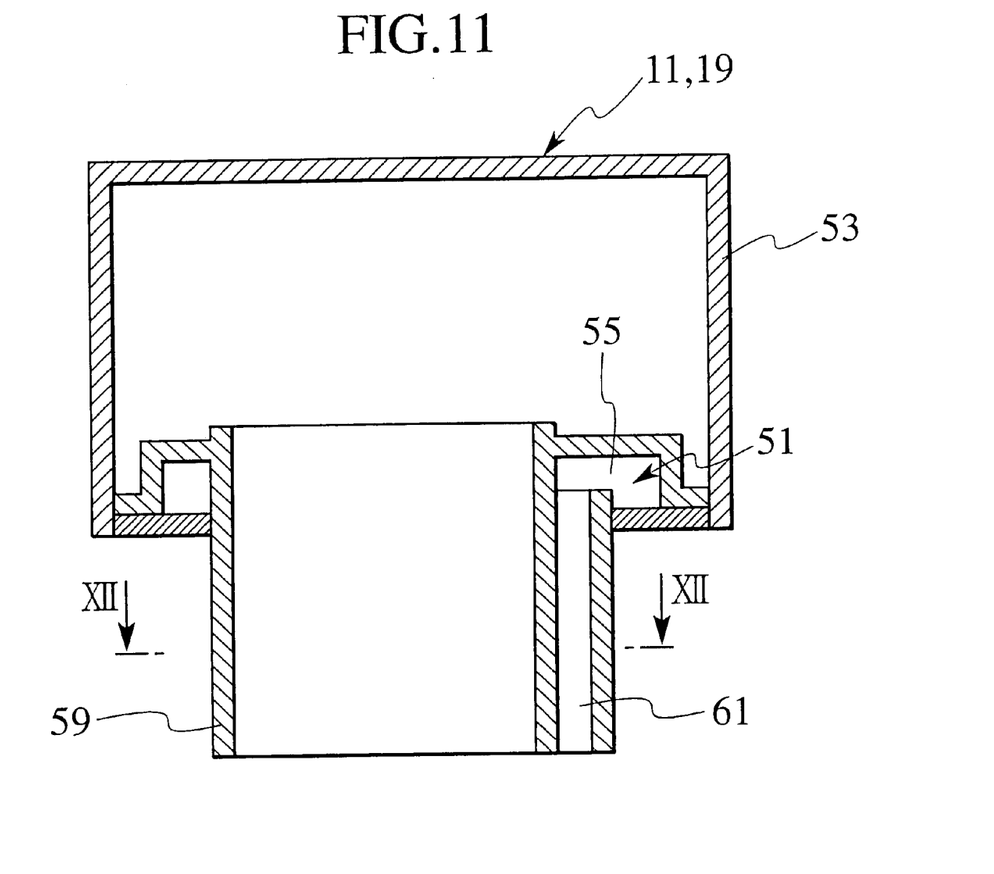
FIG. 11 is a cross sectional view taken on line A—A of FIG. 10.
Figure 12:
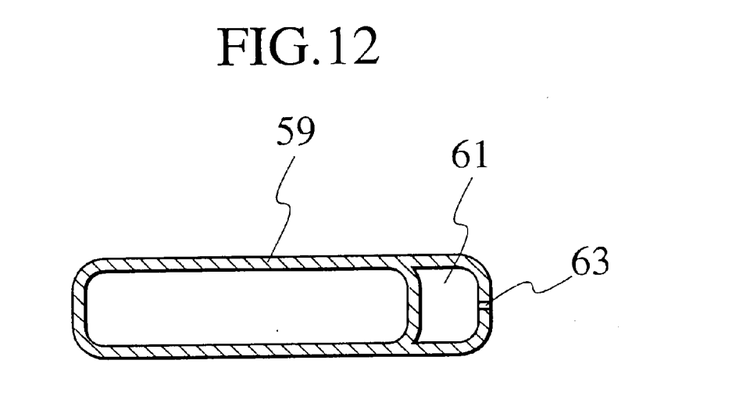
FIG. 12 is a cross sectional view taken on line B—B of FIG. 11.

FIGS. 10 to 12 show a vehicular cooling system of a fifth preferred embodiment according to the present invention which includes, in place of nozzles 27 and 29, a water supply passage 51 disposed each inside the heat radiators 11 and 19 to supply water thereto. FIG. 11 is a cross sectional view taken on line A—A of FIG. 10, and FIG. 12 is a cross sectional view taken on line B—B of FIG. 11.

More particularly, the water supply passage 51 is comprised of a tank-inside passageway 55 formed along a lower surface of an upper tank 53 forming part of the heat radiators 11 and 19, and a pipe-side passageway 61 formed along an outer wall of a connecting pipe 59 which provides fluid communication with the upper tank 53 and a lower tank 57 forming another part of the heat radiators 11 and 19. The pipe-side passageway 61 is formed with water supply ports 63 from which water is discharged outside.

In operation, water delivered from the pump 37 flows through a conduit 65 to the tank-inside passageway 55 and then flows into the pipe-side passageway 61, from which water is discharged outside through the water supply ports 63 and is supplied to the heat radiators 11 and 19 which in turn are cooled.

As previously set forth in conjunction with FIG. 4, when the wind velocity Va passing through the heat radiators 11 and 19 remains at a high level, there are some instances where water supplied to the heat radiators 11 and 19 is hard to be retained and caused to be splashed away from the heat radiators 11 and 19 to provide a less capability in obtaining an adequate cooling effect. On the contrary, with the structure shown in FIGS. 10 to 12, water is supplied through the water supply passage 51, formed inside the heat radiators 11 and 19, and the water supply ports 63 to the heat radiators 11 and 19. This results in water with a lower inertia than that of water being supplied to the outer surfaces of the heat radiators through the nozzles, providing an improved ability of causing water to be retained in the heat radiators 11 and 19 to enable the cooling effect to be continued for an extended time period.

Further, since the water supply passage 51 can be unitarily structured with the heat radiators 11 and 19, there is no need for other component parts such as nozzles to be prepared, with a resultant improved freedom in layout of the component parts.

Figure 13:
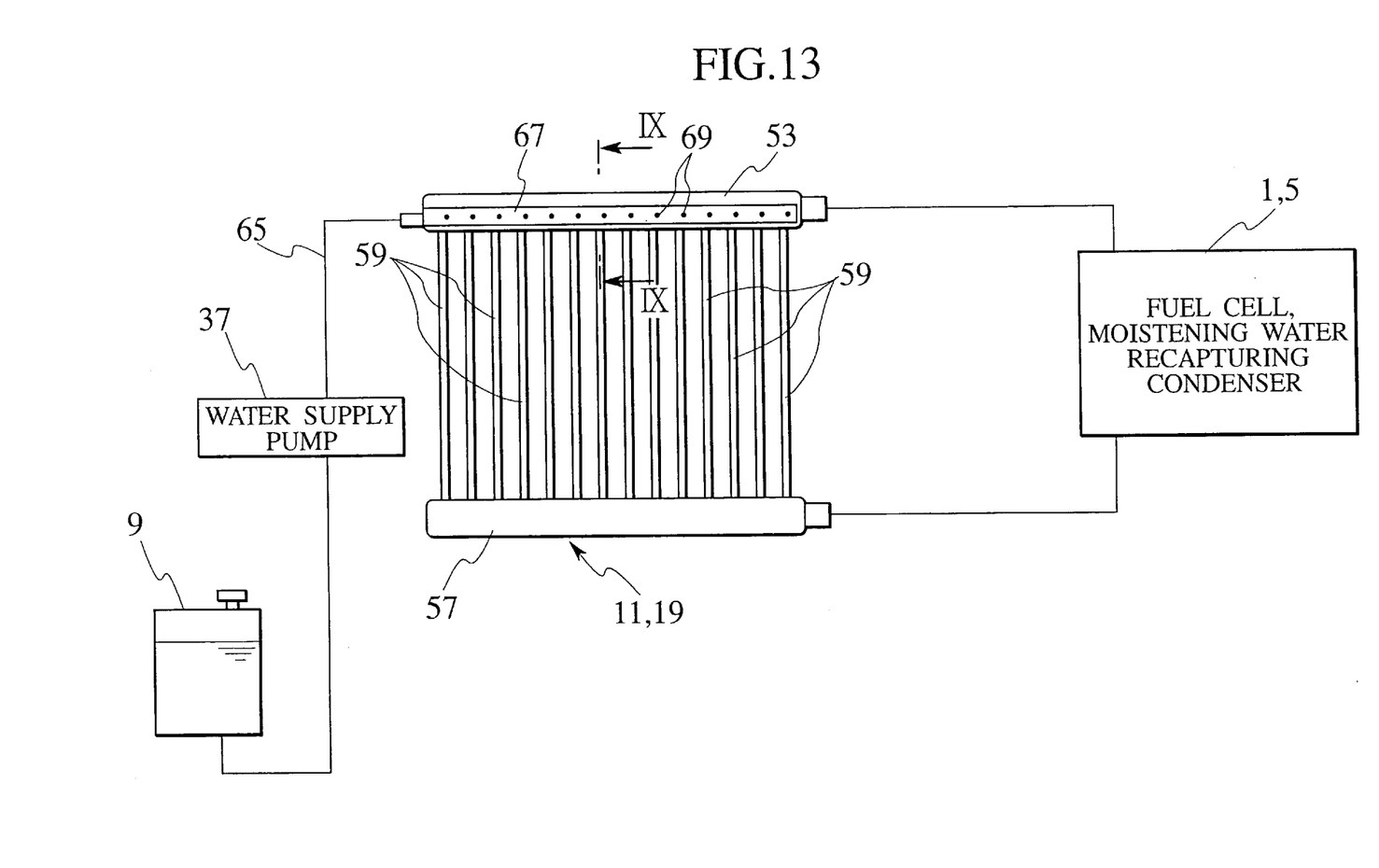
FIG. 13 is a schematic view of a vehicular cooling system of a fifth preferred embodiment according to the present invention.
Figure 14:
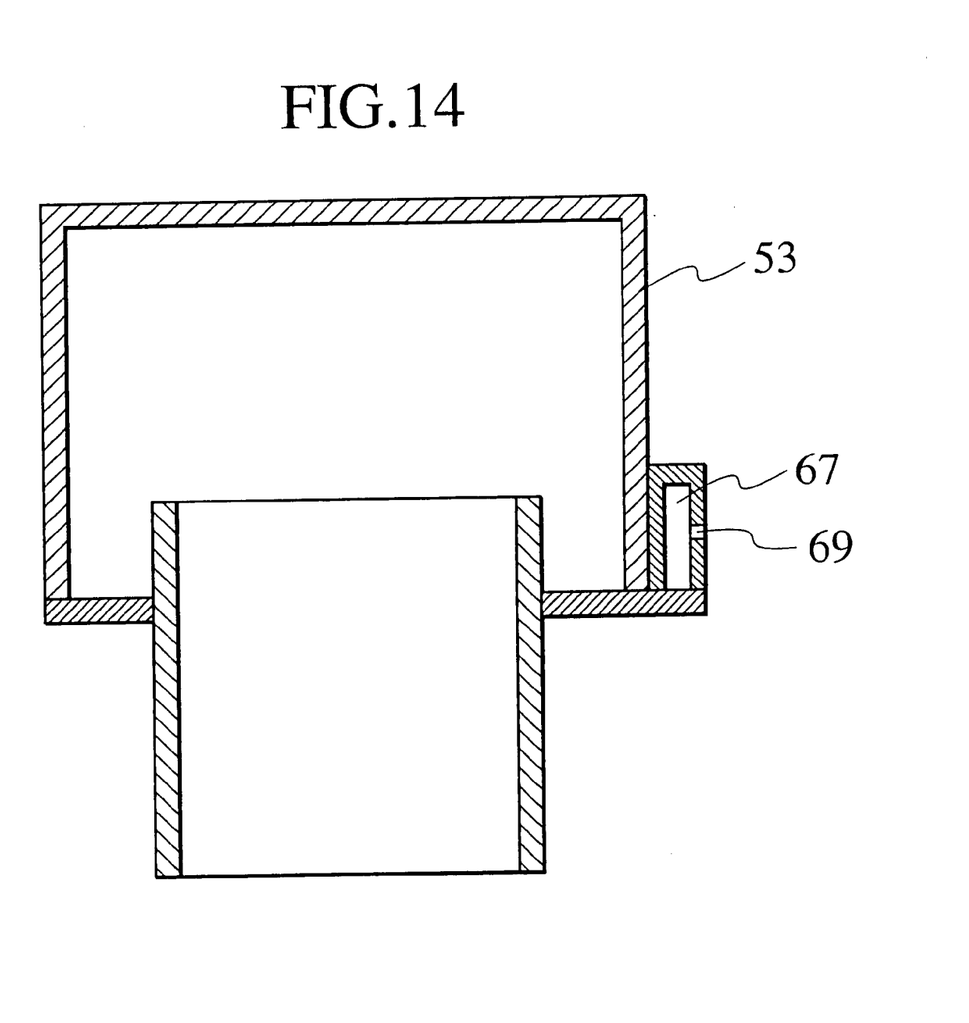
FIG. 14 is a cross sectional view taken on line C—C of FIG. 13.

FIGS. 13 and 14 show a vehicular cooling system of a sixth preferred embodiment according to the present invention that includes a water supply passage 67 formed at an outer wall of the upper tank 53. In such a structure, water delivered from the pump 37 is fed through the conduit 65 to the water supply passage 67 to allow water to be discharged through a large amount of water supply ports 69 to outside such that water is supplied to the heat radiators 11 and 19 to cool the same.

Such a preferred embodiment has the same advantage as that of the fifth preferred embodiment shown in FIGS. 10 to 12 and is further advantageously simpler in construction than that of the fifth preferred embodiment while providing an ease of fabricating the component parts.

It will now be appreciated from the foregoing description that the vehicular cooling system according to the present invention has an advantage especially for the vehicular heat source, such as the fuel cell, with a capability of supplying coolant water to either one of a plurality of heat radiators only when a demanded radiation-heat value of at least one of the heat radiators exceeds a given threshold and there is a promising cooling effect due to water being supplied to the at least one of the heat radiators whereby the plurality of heat radiators can be effectively cooled without the need for consuming a large volume of water.

The entire content of Japanese Patent Application No. P2001-174103 with a filing data of Jun. 8, 2001 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A method of cooling a vehicular heat source, comprising:

preparing a heat radiator that cools a heat source mounted in a vehicle;

preparing a water supply unit that supplies water to an outer surface of the heat radiator;

detecting a radiation-heat value demanded by the heat radiator;

detecting whether the heat radiator is promising to have a cooling effect when an outer surface of the heat radiator is supplied with water; and controlling the water supply unit in response to detected values produced in the demanded radiation-heat value detecting step and the cooling effect detecting step, respectively, such that water is supplied to the outer surface of the heat radiator for cooling the same.

2. A vehicular cooling system comprising:

a heat radiator cooling a heat source mounted in a vehicle;

a water supply unit supplying water to an outer surface of the heat radiator;

a demanded radiation-heat value detecting unit detecting a radiation-heat value demanded by the heat radiator;

a cooling effect detection unit detecting whether the heat radiator is promising to have a cooling effect when an outer surface of the heat radiator is supplied with water; and a control unit operative to drive the water supply unit such that water is supplied to the outer surface of the heat radiator for cooling the same in response to detected values of the demanded radiation-heat value detecting unit and the cooling effect detection unit.

3. The vehicular cooling system according to claim 2, wherein:

the demanded radiation-heat value detecting unit includes a coolant-water temperature detection unit detecting a temperature of coolant water in the heat source.

4. The vehicular cooling system according to claim 2, wherein:

the demanded radiation-heat value detecting unit includes a coolant-water temperature predicting unit predicting the temperature of coolant water.

5. The vehicular cooling system according to claim 2, wherein:

the cooling effect detection unit includes a moisture detection unit detecting moistures at a rear surface of the heat radiator.

6. The vehicular cooling system according to claim 2, wherein:

the cooling effect detection unit includes an index value calculating unit calculating an index value, representative of whether the cooling effect is currently continued, on the basis of a duration in which the cooling effect provided by the heat radiator is continued when supplied with water.

7. The vehicular cooling system according to claim 5, wherein:

the heat source includes a fuel cell; and wherein:

the heat radiator includes a fuel-cell heat radiator cooling the fuel cell, and a condenser heat radiator cooling a recapturing condenser for recapturing water from exhaust gases emitted from the fuel cell;

wherein the demanded radiation-heat value detecting unit detects radiation-heat values demanded by the fuel-cell heat radiator and the condenser heat radiator, respectively, whereby, when the demanded radiation-heat value detecting unit detects the presence of at least one of the demanded radiation-heat values exceeding a given threshold and when the cooling effect detection unit detects the presence of a prospect of the cooling effect, the control unit is operative to supply water to at least one of outer surfaces of the heat radiators.

8. The vehicular cooling system according to claim 7, wherein:

the demanded radiation-heat value detecting unit includes a coolant-water temperature detection unit detecting a temperature of coolant water in the fuel cell, and a water volume detecting unit detecting a volume of water within a water tank that stores water recaptured from the recapturing condenser;

wherein the control unit is operative to drive the water supply unit to allow water to be supplied to at least one of the outer surfaces of the heat radiators under a condition when the coolant-water temperature detecting unit detects the presence of the temperature of coolant water exceeding a given threshold or when the water volume detection unit detects the presence of the volume of water remaining below a given threshold and another condition when the moisture detection unit detects the presence of moisture remaining below a given moisture threshold.

9. The vehicular cooling system according to claim 7, wherein:

the demanded radiation-heat value detecting unit includes a coolant-water temperature predicting unit predicting the temperature of coolant water in the fuel cell, after a given time interval has elapsed upon receipt of coolant water, on the basis of a current temperature of coolant water and a demanded power value of the fuel cell, and a water volume predicting unit predicting the volume of coolant water within a water tank, after a given time interval has elapsed, on the basis of a current volume of water in the water tank that stores water recaptured from the recapturing condenser and the demanded power value of the fuel cell;

wherein the control unit is operative to drive the water supply unit to allow water to be supplied to at least one of the outer surfaces of the heat radiators when the coolant-water temperature predicting unit predicts the presence of the coolant-water temperature exceeding a given value or wherein the water volume predicting unit predicts the presence of a water volume remaining below a given volume.

10. The vehicular cooling system according to claim 7, wherein:

each outer surface of the heat radiators, to be supplied with water, includes a plurality of divided cooling surfaces;

wherein the control unit is operative to allow the water supply unit to supply water to the divided cooling surfaces at different timings.

11. The vehicular cooling system according to claim 10, wherein:

the water supply unit includes a plurality of nozzles in association with the plurality of divided cooling surfaces.

12. The vehicular cooling system according to claim 10, wherein:

the water supply unit includes a nozzle having an outlet enabled to be orientated toward each of the divided cooling surfaces.

13. The vehicular cooling system according to claim 10, wherein:

the water supply unit includes water supply passages located in the heat radiators, respectively, to allow water to be supplied thereto, and water supply ports located in each of the water supply passages to supply water to each of the heat radiators.

14. The vehicular cooling system according to claim 13, wherein:

each of the heat radiators includes an upper tank, a lower tank and a plurality of connecting pipes providing fluid communication between the upper tank and the lower tank; and each of the water supply passages extends along an outer surface of each of the connecting pipes, with the water supply passages being formed with the water supply ports.

15. The vehicular cooling system according to claim 13, wherein:

each of the heat radiators includes an upper tank, a lower tank and a plurality of connecting pipes providing fluid communication between the upper tank and the lower tank; and each of the water supply passages extends along an outer surface of the upper tank.

16. A vehicular cooling system comprising:

heat radiator means for cooling a heat source mounted in a vehicle;

water supply means for supplying water to an outer surface of the heat radiator;

demanded radiation-heat value detecting means for detecting a radiation-heat value demanded by the heat radiator;

cooling effect detection means for detecting whether the heat radiator has a prospect to provide a cooling effect when an outer surface of the heat radiator is supplied with water; and control means for driving the water supply means to allow water to be supplied to and to cool the outer surface of the heat radiator means in response to detected values of the demanded radiation-heat value detecting means and the cooling effect detection means.

* * * * *